(12) United States Patent
Haußner et al.

(10) Patent No.: US 8,943,877 B2
(45) Date of Patent: Feb. 3, 2015

(54) COMBUSTION CHAMBER PRESSURE GAUGE

(71) Applicant: BorgWarner BERU Systems GmbH, Ludwigsburg (DE)

(72) Inventors: Michael Haußner, Benningen (DE); Christian Pottiez, Eppingen (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 0 days.

(21) Appl. No.: 14/172,450

(22) Filed: Feb. 4, 2014

(65) Prior Publication Data

US 2014/0216145 A1 Aug. 7, 2014

(30) Foreign Application Priority Data

Feb. 6, 2013 (DE) .......................... 10 2013 101 177

(51) Int. Cl.
*G01M 15/08* (2006.01)
*F02P 19/02* (2006.01)
*F02D 35/02* (2006.01)

(52) U.S. Cl.
CPC .............. *G01M 15/08* (2013.01); *F02P 19/028* (2013.01); *F02D 35/023* (2013.01)
USPC ..................................... 73/114.19; 73/114.18

(58) Field of Classification Search
CPC . F02D 35/023; F23Q 2007/002; F23Q 7/001; F02P 19/028; G01M 15/08
USPC .......................................... 73/114.18, 114.19
See application file for complete search history.

(56) References Cited

U.S. PATENT DOCUMENTS

| 7,032,438 | B2 * | 4/2006 | Heinzelmann et al. .... 73/114.21 |
| 7,228,730 | B2 * | 6/2007 | Haussner et al. .......... 73/114.19 |
| 7,316,164 | B2 * | 1/2008 | Toyoda et al. ................... 73/723 |
| 7,444,973 | B2 * | 11/2008 | Boucard et al. ............ 123/179.6 |
| 7,829,824 | B2 | 11/2010 | Last |
| 8,205,490 | B2 * | 6/2012 | Mueller ...................... 73/114.19 |
| 8,397,556 | B2 | 3/2013 | Last et al. |
| 8,429,956 | B2 * | 4/2013 | Borgers et al. ............. 73/114.18 |
| 2005/0252297 | A1 * | 11/2005 | Heinzelmann et al. ......... 73/708 |
| 2006/0053875 | A1 * | 3/2006 | Haussner et al. ............... 73/116 |
| 2006/0090566 | A1 * | 5/2006 | Oda ............................... 73/715 |
| 2006/0137655 | A1 * | 6/2006 | Dordet .......................... 123/435 |
| 2007/0228030 | A1 * | 10/2007 | Boucard et al. ............... 219/270 |
| 2008/0216786 | A1 * | 9/2008 | Ramond et al. ........... 123/143 A |
| 2009/0026889 | A1 * | 1/2009 | Wolfer et al. .................. 310/338 |
| 2009/0126472 | A1 | 5/2009 | Hirose et al. |
| 2013/0008886 | A1 * | 1/2013 | Pottiez et al. ................. 219/538 |
| 2013/0047716 | A1 * | 2/2013 | Pottiez et al. ............. 73/114.19 |
| 2013/0206092 | A1 * | 8/2013 | Pottiez et al. ............. 123/145 A |
| 2014/0216145 | A1 * | 8/2014 | Hau ner et al. ............ 73/114.19 |

FOREIGN PATENT DOCUMENTS

| DE | 10 2005 051 817 B4 | 5/2007 |
| DE | 10 2007 049 971 A1 | 4/2009 |
| DE | 10 2008 020 510 B4 | 11/2009 |
| DE | 10 2010 037 476 A1 | 3/2012 |

* cited by examiner

*Primary Examiner* — Freddie Kirkland, III
(74) *Attorney, Agent, or Firm* — Bose McKinney & Evans LLP

(57) ABSTRACT

A combustion chamber pressure gauge for an internal combustion engine, comprising a housing tube, a plunger, which is movable in an axial direction in the housing tube under the effect of combustion chamber pressure against a restoring force, and comprising a seal, which is disposed between the plunger and the housing tube, and comprising a sensor for detecting an axial displacement of the plunger. The sensor is decoupled from thermally induced expansions or contractions of the housing tube, in that the sensor is attached to a carrier, which is suspended in the housing tube, and the plunger is movable relative to the carrier under the effect of combustion chamber pressure.

22 Claims, 4 Drawing Sheets

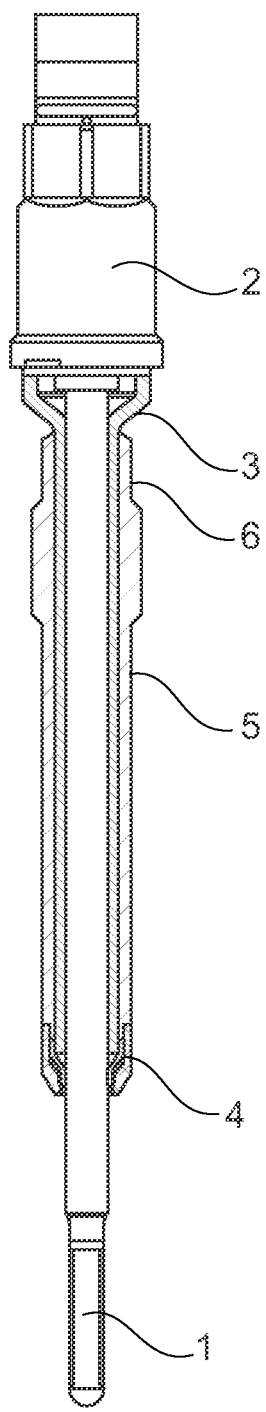
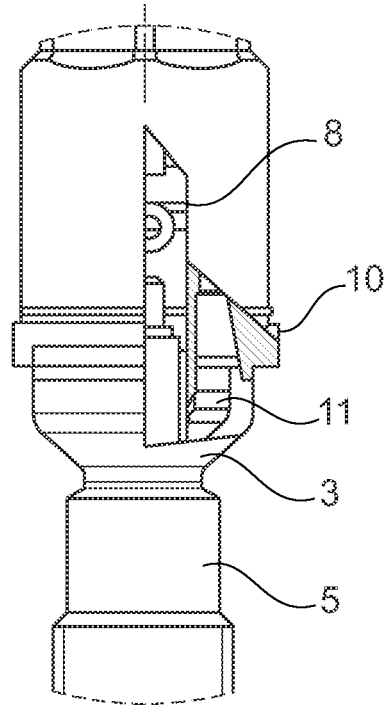
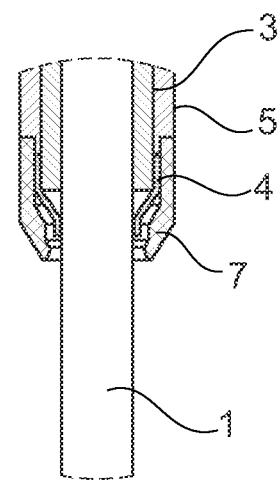
Fig. 3
Fig. 5
Fig. 4

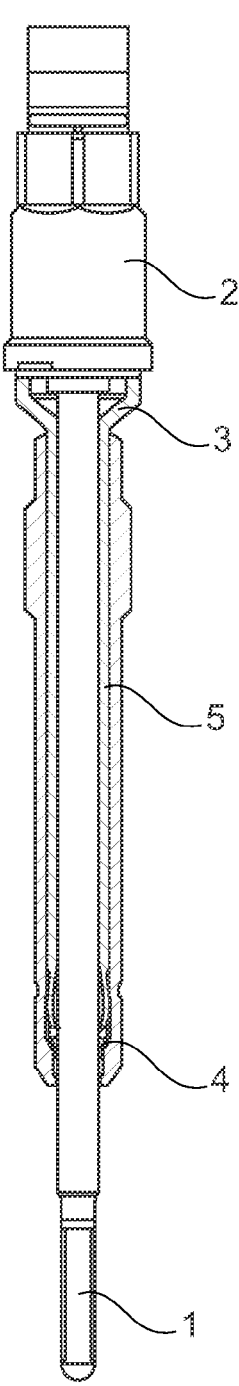
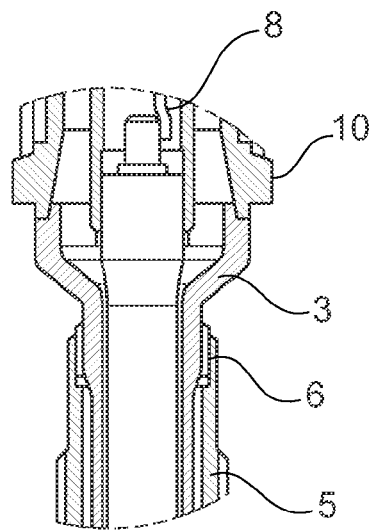
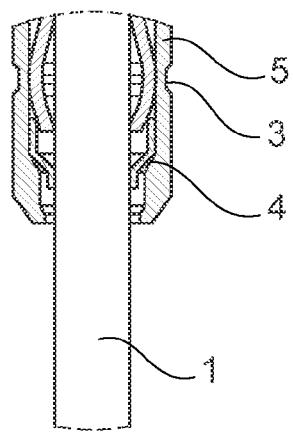
Fig. 6
Fig. 8
Fig. 7

COMBUSTION CHAMBER PRESSURE GAUGE

RELATED APPLICATIONS

This application claims priority to DE 10 2013 101 177.2, filed Feb. 6, 2013, the entire disclosure of which is hereby incorporated herein by reference in its entirety.

BACKGROUND

The invention relates to a combustion chamber pressure gauge for measuring the pressure in a combustion chamber of an internal combustion engine. Pressure gauges of this type are generally known from DE 10 2010 037 476 A1. In such combustion chamber pressure gauges, a plunger is displaced against a restoring force under the effect of combustion chamber pressure. The axial displacement of the plunger, as the measure of the combustion chamber pressure, is detected by means of a sensor.

SUMMARY

This disclosure teaches a way to measure combustion chamber pressure in the engine of a motor vehicle with greater precision.

A pressure gauge according to this disclosure can be designed as a glow plug, in that the axially movable plunger is a glow element. This is not required, however. In diesel engines, a separate glow plug can also be provided in addition to a pressure sensor, and a glow plug is not required for gasoline engines.

Within the scope of this disclosure it has been recognized that a thermal expansion or contraction of the housing tube in known combustion chamber pressure gauges causes the sensor to move relative to a plunger. Similar relative movements of the sensor relative to the plunger can also be caused by a compression of the housing tube as a result of torque applied upon screwing into an engine block. Such movements are difficult to distinguish from a pressure-induced displacement of the plunger and therefore result in a corruption of the measurement signal.

In a combustion chamber pressure gauge according to this disclosure, the sensor is attached to a carrier, which is suspended in a housing tube and is thereby decoupled from thermally induced expansions or contractions of the housing tube. The suspension of the sensor mechanically decouples or disconnects the sensor from the housing tube. The carrier makes it possible for the sensor to move relative to a section of the housing tube adjacent to the sensor. An expansion or contraction of the housing tube can therefore be compensated for by a movement of the sensor relative to the section of the housing tube adjacent thereto, thereby reducing or even completely preventing a corruption of the measurement signal.

A seal is also preferably attached to the carrier. The seal prevents combustion chamber gases from escaping from the combustion chamber of the engine and encloses the plunger. Movements of housing sections relative to one another that are associated with an expansion or contraction of the housing tube are therefore not transferred, and are transferred only very slightly to the sensor or the seal. In a combustion chamber pressure gauge according to this disclosure, the distance of the sensor relative to the seal is therefore independent—to the greatest possible extent—of the temperature of the housing tube and the installation preload. In the case of a combustion chamber pressure gauge according to this disclosure, the axial displacement of the plunger relative to the sensor therefore results in a much more precise determination of the combustion chamber pressure.

According to an advantageous refinement of this disclosure, the carrier has a longitudinal design, and is designed as a strap or sleeve, for example. Due to the suspension, the carrier is attached to the housing tube only at a small portion of the length of the carrier. Therefore, it is also only this portion of the carrier that is affixed relative to the housing tube, for example an end section. All the remaining sections of the carrier can move relative to the housing when the housing expands or contracts. A longitudinal carrier therefore decouples the distance between the sensor and the seal from thermally induced expansions or contractions of the housing tube in a particularly effective manner.

According to a further advantageous refinement of this disclosure, the carrier is attached to the housing only via an annular section. The length of this annular section in the axial direction is preferably less than the maximum diameter thereof. The shorter the section of the carrier is that is attached to the housing tube and is therefore affixed relative thereto, the better the decoupling of the sensor from thermally induced expansions or contractions of the housing tube. The carrier can be attached to the housing tube by means of a single weld seam, for example. A plurality of attachment points, e.g., weld seams or weld points, can also be disposed next to one another in the axial direction in the annual section, however. The length of the section via which the carrier is attached to the housing tube is then defined by the axial distance between the two attachment points located furthest from one another.

According to a further advantageous refinement of this disclosure, the housing tube comprises an external thread, wherein the carrier is attached to the housing tube only between a first end of the housing tube and the external thread. The carrier is fixed relative to the housing tube only where the carrier is attached to the housing tube. If the carrier is attached to the housing tube only between a first end of the housing tube and the external thread, then the carrier is only attached there relative to the housing tube. If the carrier also extends between the second end of the housing tube and the external thread, then the carrier is movable there relative to the housing tube. The first end can be the end on the combustion-chamber side, for example, that is, the end from which, in the case of a glow plug, the plunger designed as the glow element protrudes. It is also possible, however, for the carrier to be attached to the housing tube only between the thread and the end that is remote from the combustion chamber.

According to a further advantageous refinement of this disclosure, the carrier and the housing tube are coupled via at least one radial projection, which transfers rotational motion of the carrier to the housing, and a stop surface, which the radial projection abuts. A radial projection and a stop surface working together therewith can form a keyed joint and do not limit the axial mobility of the carrier relative to the housing tube, but make it possible to transfer a torque from the carrier to the housing tube. Such a keyed joint can be combined with a weld. In this manner, the attachment of the carrier to the housing tube, e.g., a welded joint, can be relieved of the torques occurring upon screwing into the engine block. The radial projection and the stop surface can be designed as a splined shaft connection, a toothed shaft connection, a multitooth connection, or a feather key connection, for example. The radial projection might be part of the housing tube or part of the carrier. It is also possible that both the housing tube and the carrier have a radial projection and a stop surface.

Particularly good decoupling can be achieved when the external thread is located between the sensor and the first end of the housing tube with respect to the axial direction.

The sensor can be disposed in the housing tube or can be located outside the housing tube, for example in that the carrier protrudes from the housing tube.

BRIEF DESCRIPTION OF THE DRAWINGS

Further details and advantages of these teachings are explained using embodiments, with reference to the attached drawings. Components that are identical and correspond to one another are labelled therein using identical reference characters. In the drawings:

FIG. 3 shows an illustrative embodiment of a combustion chamber pressure gauge in the form of a glow plug;

FIG. 4 shows a detailed view of FIG. 1;

FIG. 5 shows a further detailed view of FIG. 1;

FIG. 6 shows a further illustrative embodiment of a combustion chamber pressure gauge in the form of a glow plug;

FIG. 7 shows a detailed view of FIG. 6;

FIG. 8 shows a further detailed view of FIG. 6; and

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
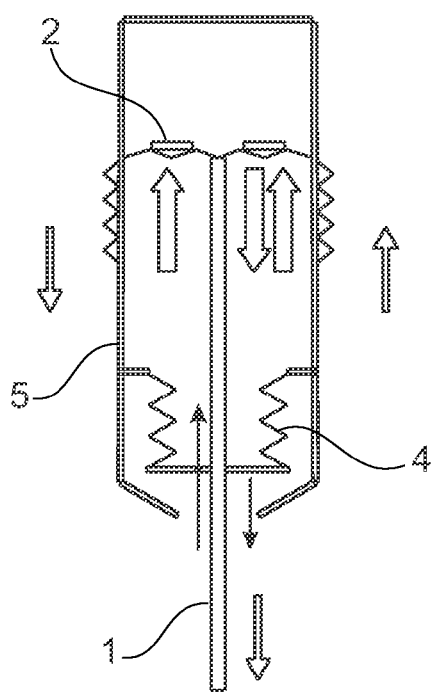
FIG. 1 shows a schematic depiction of a conventional combustion chamber pressure gauge.

FIG. 1 shows a schematic diagram of a combustion chamber pressure gauge according to the prior art. The combustion chamber pressure gauge has a housing tube 5 from which a plunger 1 protrudes. The plunger 1 is attached to the housing tube 5 via a seal 4, for example a diaphragm or a bellows. When the plunger 1 moves in the longitudinal direction, the seal 4 and, possibly, further components generate a restoring force. The strength of a combustion chamber pressure acting on the plunger 1 determines the extent to which the plunger 1 is pressed into the housing tube 5. The axial displacement of the plunger 1 is detected by a sensor 2 and the combustion chamber pressure is thereby measured.

The combustion chamber pressure gauge is screwed into an engine block by means of an external thread of the housing tube 5. The preload generated thereby induces a compression of the tube housing 5 and, therefore, a movement of the sensor 2 relative to the plunger 1 and the seal 4. A movement of the sensor 2 relative to the plunger 1 and the seal 4 can also be induced by a thermally induced expansion or contraction of the housing tube. Such movements of the sensor 2 relative to the plunger 1 are substantially slower than displacements caused by changes in the combustion pressure and, therefore, can be distinguished from the actual useful signal and can be compensated for electronically. The digital signal preparation required therefor is complex, however. In addition, aliasing effects and time delays, which limit the measurement accuracy, also occur in this case.

Figure 2:
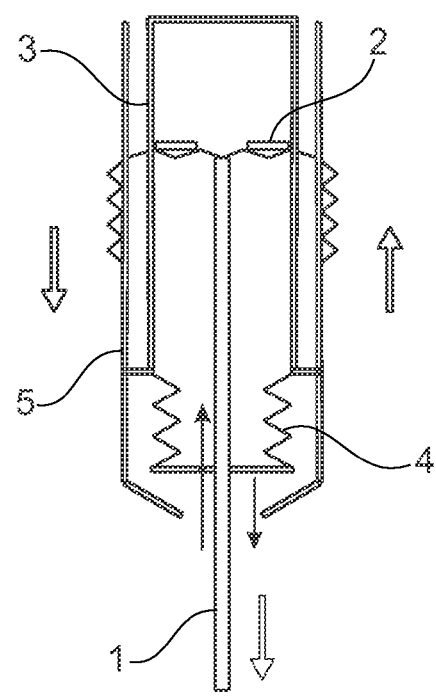
FIG. 2 shows a schematic depiction of a combustion chamber pressure gauge according to this disclosure.
Figure 9A:
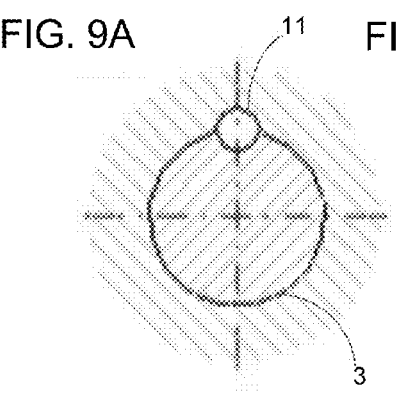
FIGS. 9A-9F schematically depict various connections between the carrier and the housing tube.
Figure 9B:
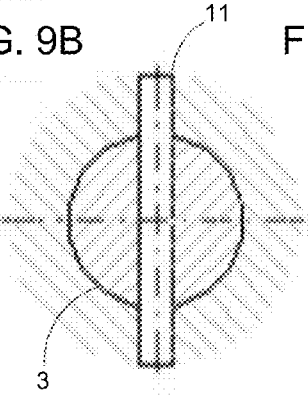
Figure 9C:
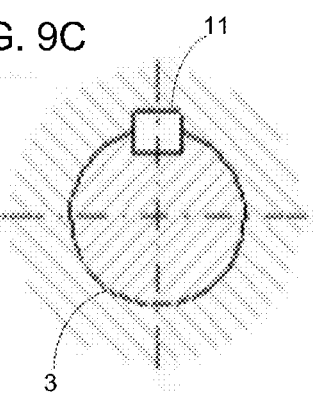
Figure 9D:
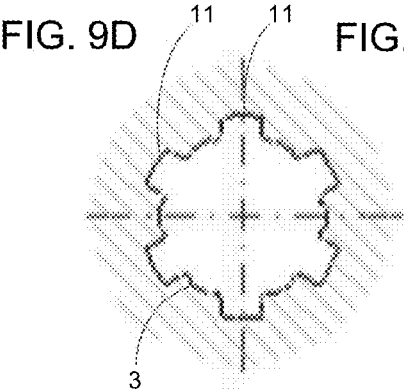
Figure 9E:
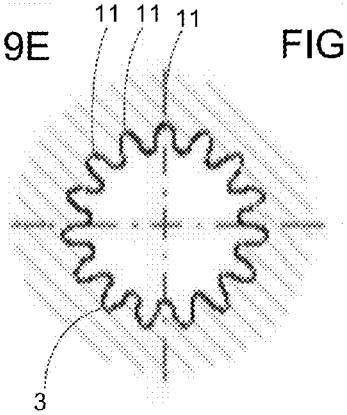
Figure 9F:
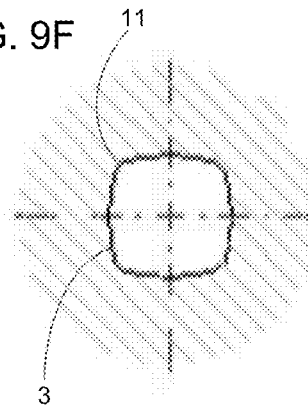

FIG. 2 shows a schematic diagram of a combustion chamber pressure gauge according to this disclosure. In such a combustion chamber pressure gauge, the sensor 2 is attached to a carrier 3, which is suspended in the housing tube 5. One end of the carrier 3 is attached on the housing tube 5 and is therefore fixed thereto. The other end of the carrier 3, on which the sensor 2 is disposed, is movable relative to the housing tube 5. The sensor 2 is therefore movable relative to the section of the housing tube 5 located closest to the sensor and is therefore decoupled from mechanically or thermally induced expansions or contractions of the housing tube 5. An expansion or compression of the housing tube 5 therefore has no effect or only a negligibly minor effect on the position of the sensor 2 relative to the plunger 1. The combustion chamber pressure can therefore be determined with improved precision on the basis of the axial position of the plunger 1, which is measured with the sensor 2.

FIG. 3 shows an illustrative embodiment of a combustion chamber pressure gauge for an internal combustion engine, wherein this combustion chamber pressure gauge is designed as a glow plug. The plunger 1, which protrudes from the housing tube 5, is therefore designed as a glow element. FIG. 2 shows a detailed view of the end of the housing tube 5, on the combustion-chamber side, having the protruding plunger 1 and the seal 4 surrounding the plunger 1, wherein this seal can be a metallic diaphragm or a bellows. FIG. 3 shows a detailed view of the end of the housing tube 5 that is remote from the combustion chamber.

The strength of the combustion chamber pressure determines the extent to which the plunger 1 is pressed into the housing tube 5 against a restoring force, which is generated by the seal 4 and, possibly, further components. The axial displacement of the plunger 1 and, therefore, the position of the plunger 1, which is dependent on the combustion chamber pressure, are therefore determined by a sensor 2. The sensor 2 is attached to a carrier 3, which is suspended on the housing tube 5, and is therefore decoupled from a thermally induced expansion or contraction of the housing tube 5.

The longitudinal carrier 3 can be a sleeve or a strap, for example. The carrier 3 is preferably attached to the housing tube 5 only between the external thread of the housing tube 5 and the end of the housing tube 5 on the combustion-chamber side, for example only by means of the end section thereof depicted in FIG. 2.

The section of the carrier 3 attached to the housing tube 5 can be annular, and may have a length in the axial direction that is smaller than the maximum diameter of this section. The carrier 3 can be attached to the housing tube 5 by welding, for example. The section of the carrier 3 attached to the housing tube 5 is then defined by the width of the weld seam or the axial distance from a first weld seam to the last weld seam as viewed in the axial direction.

If the housing tube 5 is compressed when screwed into an engine block, the sensor 2 can move relative to the end of the housing tube 5 remote from the combustion chamber, due to the suspension. The sensor 2 is therefore decoupled from mechanically or thermally induced expansions and contractions of the housing tube 5.

In order to lower the load on the attachment of the carrier 3 on the housing tube 5 upon screwing-in, the carrier 3 and the housing tube 5 form a keyed joint. The carrier 3 and the housing tube 5 are provided with a key and key seat. For example the carrier 3 and the housing tube 5 can be engaged with one another via a feather key or some other sunk key connection, a splined shaft connection, or a multitooth connection. In this manner, a welded joint or any other type of connection between the carrier 3 and the housing tube 5 can be relieved of torque without limiting the axial mobility of the carrier 3 relative to the housing tube 5. A single radial projection on the carrier 3 or the housing tube 5, can act as a key which works together with a stop surface acting as a key seat.

Thereby a toothed connection of the carrier 3 to the housing tube 5 can be made. FIGS. 9A-9F show various connections between the carrier 3 and housing tube 5 in which the housing tube 5 and/or carrier 3 includes one or more projections 11 that act as a key which engages a stop surface of the other of the housing tube and carrier. One of the skill in the art would readily recognize other connection variants contemplated by these teachings.

The sensor 2 can be disposed in the housing tube 5 or outside of the housing tube 5. In the illustrative embodiment shown, the carrier 3 protrudes via one end section from the housing tube 5. This end section carries the sensor 2, for example a piezoelectric sensor or a measurement diaphragm having strain gauges. The end of the housing tube 5 remote from the combustion chamber can be sealed with a seal 6 made of plastic. The carrier 3 can slide in the axial direction relative to this seal 6. The sealing element can also be designed such that this sealing element can transfer torque when screwed in and released.

The sensor 2 can be designed as a sensor unit that contains, in addition to a sensor diaphragm 10, a plug-in connector having a contact for connecting the sensor 2 and, in the case of a glow plug, a glow current connection 8.

The housing tube 5 can be formed of a plurality of parts joined together. One end piece 7 can be attached to a housing tube main part, for example, as shown in FIG. 2.

A further illustrative embodiment of a combustion chamber pressure gauge is shown in FIGS. 6 to 8, in the form of a glow plug. In contrast to the illustrative embodiment of FIGS. 3 to 5, the housing tube 5 of this combustion chamber pressure gauge is designed as one piece.

The seal 4, for example a metallic diaphragm or a metallic bellows, is attached at one side to the plunger 1, for example via soldering or welding, and is attached at the other side to the carrier 3, for example via soldering or welding. The carrier 3, for example a strap or a sleeve, is slid, together with the plunger 1 and the seal 4, into the housing tube 5 upon assembly. In the end position that is reached, one end section of the carrier 3 bears against the inside of the housing tube 5. The carrier 3 can comprise a cover or a bulge for this purpose, for example, as shown in FIG. 7. This end section of the carrier 3 can then be welded or soldered to the housing tube 5. In order to simplify this, the housing tube 5 can comprise a groove on the outer side thereof, wherein, in the region of this groove, the housing tube 5 is heated by means of a laser beam, for example, for welding or soldering.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

List of Reference Numerals
1 plunger
2 sensor
3 carrier
4 seal
5 housing tube
6 seal
7 end piece
8 glow current connection
10 sensor diaphragm
11 projection

What is claimed is:

1. A combustion chamber pressure gauge for an internal combustion engine, comprising:
a housing tube;
a plunger, which is movable in an axial direction in the housing tube under the effect of combustion chamber pressure against a restoring force;
a seal, which is disposed between the plunger and the housing tube; and
a sensor for detecting an axial displacement of the plunger, wherein the sensor is decoupled from expansions or contractions of the housing tube in that the sensor is attached to a carrier, which is suspended in the housing tube, and in that the plunger is movable relative to the carrier under the effect of combustion chamber pressure.

2. The combustion chamber pressure gauge according to claim 1, wherein the plunger is a glow pencil and the combustion chamber pressure gauge is a glow plug.

3. The combustion chamber pressure gauge according to claim 1, wherein the carrier comprises first and second end sections, wherein the first end section is attached to the housing tube and is fixed relative to the housing tube, and the second end section is movable relative to the housing tube.

4. The combustion chamber pressure gauge according to claim 1, wherein the carrier is a sleeve.

5. The combustion chamber pressure gauge according to claim 1, wherein the housing tube comprises an external thread, wherein the carrier is fastened to the housing tube only between a first end of the housing tube and the external thread.

6. The combustion chamber pressure gauge according to claim 5, wherein the external thread is located between the sensor and the first end of the housing tube relative to the axial direction.

7. The combustion chamber pressure gauge according to claim 1, wherein the carrier protrudes from the housing tube and the sensor is located outside the housing tube.

8. The combustion chamber pressure gauge according to claim 1, wherein the housing tube comprises an end piece, which is attached to a housing tube main part, and the carrier is attached at the joint of the end piece and of the housing tube main part on the housing tube.

9. The combustion chamber pressure gauge according to claim 8, wherein the joint is a weld seam, which connects the carrier, the end piece, and the housing tube main part.

10. The combustion chamber pressure gauge according to claim 1, wherein the carrier is attached to the housing tube only via an annular section.

11. The combustion chamber pressure gauge according to claim 1, wherein the carrier and the housing tube are coupled via at least one radial projection, which transfers rotational motion of the carrier to the housing tube, and a stop surface, which the radial projection abuts.

12. The combustion chamber pressure gauge according to claim 1, wherein the carrier and the housing tube form a keyed joint.

13. A combustion chamber pressure gauge for an internal combustion engine, comprising:
a housing tube;
a carrier suspended in the housing tube;
a plunger movable axially with respect to the housing tube and to the carrier under the effect of combustion chamber pressure;
a seal disposed between the plunger and the housing tube; and
the carrier carrying a sensor configured to detect axial displacement of the plunger, wherein the carrier has a section adjacent the sensor that is free from connection to the housing tube and is movable relative to the housing tube, whereby transfer of thermal contractions and expansions from the housing tube to the sensor are reduced.

14. The combustion chamber pressure gauge according to claim 13, wherein the carrier comprises first and second end sections, wherein the first end section is attached to the housing tube and is fixed relative to the housing tube, the second end section comprising the section adjacent the sensor that is free from connection to the housing tube.

15. The combustion chamber pressure gauge according to claim 13, wherein the housing tube comprises an external thread, wherein the carrier is fastened to the housing tube only between a first end of the housing tube and the external thread.

16. The combustion chamber pressure gauge according to claim 15, wherein the external thread is located in an axial direction between the sensor and an end of the housing tube.

17. The combustion chamber pressure gauge according to claim 13, wherein the carrier and the housing tube are coupled via at least one radial projection, which transfers rotational motion of the carrier to the housing tube, and a stop surface, which the radial projection abuts.

18. A combustion chamber pressure gauge for an internal combustion engine, comprising:
a housing tube;
a carrier suspended in the housing tube, the carrier having a first section affixed to the housing tube and a second section that is free from connection to the housing tube, the second section of the carrier and the housing tube being movable relative to one another when the housing tube expands or contracts;
a plunger movable axially with respect to the housing tube and to the carrier under the effect of combustion chamber pressure;
a seal disposed between the plunger and the housing tube; and
the second section of the carrier carrying a sensor configured to detect axial displacement of the plunger, whereby transfer of thermal contractions and expansions from the housing tube to the sensor are reduced.

19. The combustion chamber according to claim 18, wherein the first and section sections are end sections of the carrier.

20. The combustion chamber pressure gauge according to claim 18, wherein the housing tube comprises an external thread, wherein the carrier is fastened to the housing tube only between a first end of the housing tube and the external thread.

21. The combustion chamber pressure gauge according to claim 20, wherein the external thread is located in an axial direction between the sensor and an end of the housing tube.

22. The combustion chamber pressure gauge according to claim 18, wherein the first section of the carrier is affixed to the housing tube via at least one radial projection, which transfers rotational motion of the carrier to the housing tube, and a stop surface, which the radial projection abuts.

* * * * *